US009083412B2

(12) United States Patent  
Han et al.

(10) Patent No.: US 9,083,412 B2  
(45) Date of Patent: Jul. 14, 2015

(54) METHOD AND APPARATUS FOR TRANSMITTING/RECEIVING FEEDBACK INFORMATION IN A WIRELESS PACKET DATA COMMUNICATION SYSTEM

(75) Inventors: Jin-Kyu Han, Seoul (KR); Hwan-Joon Kwon, Suwon-si (KR); Dong-Hee Kim, Yongin-si (KR); Jae-Chon Yu, Suwon-si (KR); Yeon-Ju Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 871 days.

(21) Appl. No.: 11/933,974

(22) Filed: Nov. 1, 2007

(65) Prior Publication Data

US 2008/0101498 A1 May 1, 2008

(30) Foreign Application Priority Data

Nov. 1, 2006 (KR) ........................ 10-2006-0107500

(51) Int. Cl.
*H04B 7/02* (2006.01)
*H04B 7/06* (2006.01)
*H04L 1/00* (2006.01)
(Continued)

(52) U.S. Cl.
CPC .............. *H04B 7/065* (2013.01); *H04B 7/0632* (2013.01); *H04B 7/0641* (2013.01); *H04L 1/0026* (2013.01); *H04L 1/0039* (2013.01); *H04L 25/0222* (2013.01); *H04B 7/0452* (2013.01); *H04L 25/0204* (2013.01); *H04L 25/0228* (2013.01); *H04L 2025/03414* (2013.01);
(Continued)

(58) Field of Classification Search
CPC .................................................... H04L 1/0014
USPC ........................................................ 375/267
See application file for complete search history.

(56) References Cited

U.S. PATENT DOCUMENTS 7,062,295 B2   6/2006   Yoshii et al.
7,103,325 B1   9/2006   Jia et al.
(Continued)

OTHER PUBLICATIONS

J.S. Kim, et al., "Multi-Mode Multi-User MIMO System with Finite Rate Feedback", 3rd International Symposium on Wireless Communication Systems, Oct. 6, 2006.
(Continued)

*Primary Examiner* — Lihong Yu  
(74) *Attorney, Agent, or Firm* — The Farrell Law Firm, P.C.

(57) ABSTRACT

A Channel Quality Indicator (CQI) expression and feedback method prevents an excessive increase in the CQI feedback overhead while supporting both Single-User MIMO and Multi-User MIMO operations. When a default MIMO operation is set to Single-User MIMO or Multi-User MIMO, an access network can receive MIMO CQI feedback optimized for the corresponding MIMO operation. However, when a scheduler has selected an alternative MIMO operation other than the default MIMO operation, the access network calculates a CQI necessary for the alternative MIMO operation based on the default MIMO CQI feedback for the default MIMO operation and the DELTA CQI feedback for the alternative MIMO operation. In this manner, the invention enables the best operation in the default MIMO operation by providing a correct CQI, and enables the second best operation in the alternative MIMO operation. With use of the invention, the access network can dynamically select the Single-User MIMO and Multi-User MIMO operations, contributing to an increase in the resource management efficiency.

9 Claims, 5 Drawing Sheets

(51) Int. Cl.
 *H04B 7/04* (2006.01)
 *H04L 25/02* (2006.01)
 *H04L 25/03* (2006.01)

(52) U.S. Cl.
 CPC ........... *H04L2025/03426* (2013.01); *H04L 2025/03802* (2013.01)

(56) References Cited

U.S. PATENT DOCUMENTS 7,120,395 B2   10/2006   Tong et al.

| | | | |
|---|---|---|---|
| 2005/0013352 A1* | 1/2005 | Hottinen | 375/219 |
| 2005/0043031 A1* | 2/2005 | Cho et al. | 455/450 |
| 2005/0186983 A1* | 8/2005 | Iochi | 455/522 |
| 2007/0041429 A1* | 2/2007 | Khandekar | 375/146 |
| 2007/0099578 A1* | 5/2007 | Adeney et al. | 455/69 |

OTHER PUBLICATIONS

Qualcomm Europe, "System Operation of SU-MIMO and MU-MIMO", R1-062043, 3GPP TSG-RAN WG1 #46, Aug. 23, 2006.

* cited by examiner

METHOD AND APPARATUS FOR TRANSMITTING/RECEIVING FEEDBACK INFORMATION IN A WIRELESS PACKET DATA COMMUNICATION SYSTEM

PRIORITY

This application claims priority under 35 U.S.C. §119(a) to a Korean Patent Application filed in the Korean Intellectual Property Office on Nov. 1, 2006 and assigned Ser. No. 2006-107500, the disclosure of which is incorporated herein by reference.

BACKGROUND OF THE INVENTION

1. Field of the Invention

The present invention relates generally to a wireless packet data communication system, and in particular, to a method and apparatus for transmitting/receiving a Channel Quality Indicator (CQI) feedback channel in a wireless packet data communication system.

2. Description of the Related Art

Generally, the mobile communication system is evolving from the early voice communication system for mainly providing voice services into the high-speed, high-quality wireless packet data communication system for providing data services and multimedia services. Recently, various mobile communication standards such as High Speed Downlink Packet Access (HSDPA) and High Speed Uplink Packet Access (HSUPA) by the 3rd Generation Partnership Project (3GPP), High Rate Packet Data (HRPD) by the 3rd Generation Partnership Project 2 (3GPP2), Institute of Electrical and Electronic Engineers (IEEE) 802.16, etc. have been developed to support high-speed, high-quality wireless packet data transmission services.

The current 3G wireless packet data communication system, such as HSDPA, HSUPA, HRPD, etc., uses an Adaptive Modulation and Coding (AMC) technique and a channel-sensitive scheduling technique to improve the transmission efficiency. With use of the AMC technique, a transmitter can adjust the amount of transmission data according to the channel state. That is, the transmitter reduces the amount of transmission data to adjust the reception error probability to a desired level if the channel state is poor, and increases the amount of transmission data to adjust the reception error probability to the desired level if the channel state is good, thereby improving the data transmission efficiency. With use of the above channel-sensitive scheduling resource management method, the transmitter selectively services the user with a good channel state among several users, increasing the system capacity compared to the method of allocating a channel to a single user and servicing the user with the allocated channel. The system capacity increase is referred to as a 'multi-user diversity gain'. In short, in the AMC technique and the channel-sensitive scheduling technique, the transmitter receives partial channel state information fed back from a receiver, and applies the appropriate modulation and coding technique at the most efficient time determined depending on the received channel state information.

To realize the AMC technique and the channel-sensitive scheduling technique, the receiver should feed back the channel state information to the transmitter. The channel state information the receiver feeds back to the transmitter is referred to as a Channel Quality Indicator (CQI).

Recently, extensive research is being conducted to replace Code Division Multiple Access (CDMA), the multiple access scheme used in the 2$^{nd}$ Generation and 3$^{rd}$ Generation mobile communication systems, with Orthogonal Frequency Division Multiple Access (OFDMA) in the next generation mobile communication system. 3GPP and 3GPP2 have started standardization work on the OFDMA-based Evolved system. It is known that OFDMA, compared to CDMA, can contribute to the greater capacity increase. One of the several causes of the capacity increase in OFDMA is to perform scheduling in the frequency domain (know as 'frequency-domain scheduling'). As the capacity gain was obtained through the channel-sensitive scheduling technique according to the characteristic that the channel varies with the passage of time, a greater capacity gain can be obtained with the use of the characteristic that the channel varies according to the frequency. However, to support the frequency-domain scheduling, the transmitter should previously have the channel state information for each individual frequency. That is, CQI feedback is needed separately for each frequency, increasing the CQI feedback load.

In the next generation system, research is being conducted to introduce a Multiple Input Multiple Output (MIMO) technology using multiple transmit/receive antennas. The term 'MIMO' as used herein refers to a technology for simultaneously transmitting multiple data streams via multiple transmit/receive antennas using the same resources. It is known that transmitting multiple low-modulation order data streams, compared to increasing the modulation order in a good channel state, is a better way to increase the throughput at the same error probability.

In the MIMO technology, the dimension over which an individual data stream is transmitted is called a 'layer'. A method of separately applying AMC according to the channel state of the layer is efficient in increasing the capacity. For example, Per Antenna Rate Control (PARC) is a technology for transmitting different data streams via every transmit antenna, and here, the layer is the transmit antennas. Multiple transmit antennas undergo different channels, and the PARC technique applies AMC such that a greater amount of data can be transmitted via transmit antennas with a good channel state and a lesser amount of data can be transmitted via transmit antennas with a poor channel state. As another example, there is Per Common Basis Rate Control (PCBRC), and in this technology, the layer is a fixed transmission beam. Therefore, the PCBRC technique transmits a greater amount of data over transmission beams with a good channel state, and transmits a lesser amount of data over transmission beams with a poor channel state.

Space Division Multiple Access (SDMA), a technology for allocating different users to multiple transmission beams, can increase the capacity through space-domain scheduling, as OFDMA can increase the capacity through frequency-domain scheduling.

The MIMO and SDMA technologies are also referred to as Single-User MIMO and Multi-User MIMO, respectively. That is, data streams are transmitted separately over individual layers, and the transmission is classified into Single-User MIMO and Multi-User MIMO depending on whether they head toward a single user or multiple users.

Figure 1A:
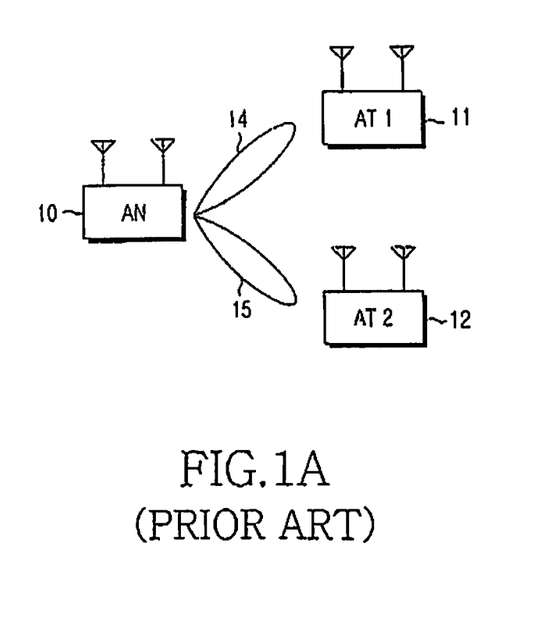
FIGS. 1A and 1B illustrate the concept of Multi-User MIMO and the concept of Single-User MIMO, respectively.

FIG. 1A illustrates the concept of Multi-User MIMO.

Referring to FIG. 1A, an Access Network (AN) 10 transmits a data stream to two Access Terminals (ATs) 11 and 12. Here, because the data stream is transmitted over the same frequency/time resources, it should be transmitted over separated space resources. Therefore, the data stream being transmitted to the access terminal #1 11 is transmitted with one beam 14, and the data stream being transmitted to the access terminal #2 12 is transmitted with another beam 15.

Figure 1B:
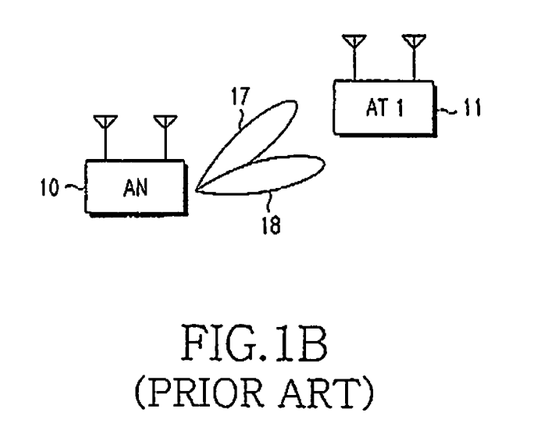

FIG. 1B illustrates the concept of Single-User MIMO.

Referring to FIG. 1B, unlike in Multi-User MIMO, an access network 10 transmits multiple data streams to one access terminal 11. Therefore, the beams 17 and 18 formed by the access network 10 both head for one access terminal 11.

There is a difference between CQI calculation in Single-User MIMO and CQI calculation in Multi-User MIMO. In Single-User MIMO, a receiving access terminal can apply a layer-based interference cancellation technique because it is designed to receive signals of all layers. However, in Multi-User MIMO, the receiving access terminal cannot perform decoding and interference cancellation on the signals of some layers transmitted to another user. Therefore, the access terminal should calculate a CQI with the inter-layer interference cancelled, when the access terminal operates in Single-User MIMO. However, the access terminal should calculate a CQI with the inter-layer interference considered, when the access terminal operates in Multi-User MIMO.

If a scheduler of the access network has a freedom to select operations of Single-User MIMO and Multi-User MIMO, the access terminal should feed back a CQI supporting the both operations. However, the access terminal, when it already applies MIMO, feeds back a CQI of each individual layer (hereinafter referred to as layer-based CQI). Therefore, in the state where the amount of feedback has already increased, if the access terminal feeds back all CQIs supporting the both operations, the feedback overhead may excessively increase.

SUMMARY OF THE INVENTION

An aspect of the present invention is to address at least the above problems and/or disadvantages and to provide at least the advantages described below. Accordingly, an aspect of the present invention is to provide a method and apparatus for transmitting/receiving feedback information to reduce overhead in a wireless packet data communication system supporting a Single-User MIMO mode and a Multi-User MIMO mode.

Another aspect of the present invention is to provide a method and apparatus for calculating a CQI to efficiently reduce overhead in a wireless packet data communication system supporting a Single-User MIMO mode and a Multi-User MIMO mode.

According to one aspect of the present invention, there is provided a method for receiving feedback information by an access network in a wireless packet data communication system supporting a Single-User Multiple Input Multiple Output (MIMO) mode and a Multi-User MIMO mode. The feedback information reception method includes setting a default MIMO mode and transmitting information on the setting to an access terminal; receiving, from the access terminal, default MIMO Channel Quality Indicator (CQI) feedback information for the set default MIMO mode and DELTA MIMO CQI feedback information for an alternative MIMO mode; calculating a Single-User MIMO CQI by parsing the default MIMO CQI feedback information as the Single-User MIMO CQI when the default MIMO mode is set to Single-User MIMO, and calculating a Multi-User MIMO CQI by parsing a value obtained by subtracting the DELTA CQI feedback information from the default MIMO CQI feedback information as the Multi-User MIMO CQI when the alternative MIMO mode is set to Multi-User MIMO; and performing scheduling on transmission data using the calculated CQIs.

According to another aspect of the present invention, there is provided a method for transmitting feedback information by an access terminal in a wireless packet data communication system supporting a Single-User Multiple Input Multiple Output (MIMO) mode and a Multi-User MIMO mode. The feedback information transmission method includes extracting a pilot through a received channel; estimating a channel through the extracted pilot; generating, depending on the channel-estimated value, a Single-User MIMO Channel Quality Indicator (CQI) as default MIMO CQI feedback information when a default MIMO mode preset in an access network is set to Single-User MIMO, and generating a Multi-User MIMO CQI as DELTA CQI feedback information when an alternative MIMO mode is set to Multi-User MIMO; and transmitting the generated feedback information to the access network.

According to further another aspect of the present invention, there is provided an apparatus for receiving feedback information by an access network in a wireless packet data communication system supporting a Single-User Multiple Input Multiple Output (MIMO) mode and a Multi-User MIMO mode. The feedback information reception apparatus includes a default MIMO Channel Quality Indicator (CQI) feedback information receiver for receiving default MIMO CQI feedback information for a preset default MIMO mode from an access terminal; a DELTA CQI feedback information receiver for receiving DELTA MIMO CQI feedback information for an alternative MIMO mode from the access terminal; a Single-User CQI calculator for calculating a Single-User MIMO CQI by parsing the default MIMO CQI feedback information as the Single-User MIMO CQI when the default MIMO mode is set to Single-User MIMO, and calculating a Single-User MIMO CQI by parsing a value obtained by adding the default MIMO CQI feedback information to the DELTA CQI feedback information as the Single-User MIMO CQI when the alternative MIMO mode is set to Single-User MIMO; a Multi-User CQI calculator for calculating a Multi-User MIMO CQI by parsing the default MIMO CQI as the Multi-User MIMO CQI when the default MIMO mode is set to Multi-User MIMO, and calculating a Multi-User MIMO CQI by parsing a value obtained by subtracting the DELTA CQI feedback information from the default MIMO CQI feedback information as the Multi-User MIMO CQI when the alternative MIMO mode is set to Multi-User MIMO; a scheduler and transmitter for scheduling and transmitting transmission data based on output values of the Single-User CQI calculator and the Multi-User CQI calculator; and a controller for controlling the Single-User CQI calculator and the Multi-User CQI calculator according to whether the default MIMO mode is set to Single-User MIMO or Multi-User MIMO.

According to yet another aspect of the present invention, there is provided an apparatus for transmitting feedback information by an access terminal in a wireless packet data communication system supporting a Single-User Multiple Input Multiple Output (MIMO) mode and a Multi-User MIMO mode. The feedback information transmission apparatus includes a pilot extractor for extracting a pilot through a received channel; a pilot estimator for estimating a channel through the extracted pilot and outputting a channel-estimated value; a Channel Quality Indicator (CQI) estimator for calculating a Single-User MIMO CQI and a Multi-User MIMO CQI using the channel-estimated value; a default MIMO CQI feedback information generator for generating a Single-User MIMO CQI as default MIMO CQI feedback information when a default MIMO mode preset in an access network is set to Single-User MIMO; a DELTA CQI feedback information generator for generating a Multi-User MIMO CQI as DELTA CQI feedback information when the alternative MIMO mode is set to Multi-User MIMO; and a controller for controlling the default MIMO CQI feedback information generator and the DELTA CQI feedback information generator to generate the default MIMO CQI feedback information and the DELTA CQI feedback information according to whether the default MIMO mode is set to Single-User MIMO or Multi-User MIMO.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a method for reducing overhead while supporting a MIMO operation in a mobile communication system supporting a Single-User MIMO mode and a Multi-User MIMO mode.

In this mobile communication system, to support the two modes, the following two methods are available for an access network.

A first method is to feed back both a CQI for Single-User MIMO and a CQI for Multi-User MIMO to support both Single-User MIMO and Multi-User MIMO operations. A second method is to restrictively support only one of the Single-User MIMO and Multi-User MIMO operations in one resource block.

With use of the first method for feeding back both types of CQIs, a scheduler of the access network can make the best choice in the resource management, but the CQI feedback overhead of the access network may undesirably increase.

However, the use of the second method for restrictively supporting only one MIMO operation reduces the system performance due to the restriction on the resource management, but may prevent the increase in the CQI feedback overhead.

Therefore, the present invention proposes an apparatus and method for feeding back CQI information so as to prevent an increase in the CQI feedback overhead while supporting both the Single-User MIMO and Multi-User MIMO operations.

The access network proposed by the present invention sets one of the Single-User MIMO and Multi-User MIMO operation modes as a default MIMO operation mode. Herein, the MIMO operation mode other than the default MIMO operation mode will be referred to as an 'alternative MIMO operation mode'. An access terminal calculates a CQI based on the fact that its operation mode is set to the default MIMO operation mode. That is, according to the present invention, when Single-User MIMO is set as the default MIMO operation mode, the access network calculates a CQI on the assumption that the inter-layer interference is cancelled. However, when Multi-User MIMO is set as the default MIMO operation mode, the access network calculates a CQI considering the inter-layer interference.

The access terminal reports to the access network over a CQI feedback channel of a physical layer an absolute value of the calculated CQI of the default MIMO operation mode. Then the access network collects the CQI of the default MIMO operation mode, and performs AMC and channel-sensitive scheduling using the corresponding CQI feedback when the access network applies the default MIMO operation mode. In preparation for the case where the access network determines to apply the alternative MIMO operation other than the default MIMO operation mode, the access terminal calculates which DELTA CQI the alternative MIMO operation should apply compared to the default MIMO operation, and then reports the calculation result to the access network. When the default MIMO operation mode is Single-User MIMO, the alternative MIMO operation mode is Multi-User MIMO. On the contrary, when the default MIMO operation mode is Multi-User MIMO, the alternative MIMO operation mode is Single-User MIMO.

Multi-User MIMO has a lower layer-based CQI, compared to Single-User MIMO. Therefore, a layer-based CQI MU_MIMO_CQI[k] in Multi-User MIMO has the following relationship of Equation (1) with a layer-based CQI SU_MIMO_CQI[k] in Single-User MIMO.

$$MU\_MIMO\_CQI[k]=SU\_MIMO\_CQI[k]-DELTA\_CQI[k]$$

$$SU\_MIMO\_CQI[k]=MU\_MIMO\_CQI[k]+DELTA\_CQI[k] \quad (1)$$

Herein, 'k' denotes a variable indicating a layer, and it expresses the first decoded layer with '0' and increases its value on a one-by-one basis in order of the decoded layer. That is, the first layer is indicated by '0', the second layer is indicated by '1', and the final layer is indicated by 'k−1' if the maximum number of layers is 'k'. The DELTA CQI DELTA_CQI[k] indicates a difference between the CQI of Multi-User MIMO and the CQI of Single-User MIMO. Because a scope of DELTA_CQI will generally be less than a scope of MU_MIMO_CQI or SU_MIMO_CQI, it is possible to reduce the number of consumed bits by performing quantization and binary expression thereon. Based on Equation (1), DELTA_CQI can be calculated as shown in Equation (2).

$$DELTA\_CQI[k]=SU\_MIMO\_CQI[k]-MU\_MIMO\_CQI[k] \quad (2)$$

The access terminal reports the DELTA_CQI to the access network so that the access network can use it in calculating a CQI necessary for the alternative MIMO operation when it applies the alternative MIMO operation other than the default MIMO operation.

DELTA_CQI of Equation (1) is assumed to express a different value for each individual layer. In this case, the access terminal can separately report an accurate CQI necessary for the alternative MIMO operation for each layer, but the feedback overhead increases in proportion to the number of layers because the access terminal should still report different DELTA_CQI separately for each individual layer. As another embodiment of the present invention, to further reduce the feedback overhead, the access terminal calculates DELTA_CQI shown in Equation (3), and reports it to the access network.

$$DELTA\_CQI\_CONST = \frac{1}{K-1} \sum_{k=1}^{K-1} \frac{SU\_MIMO\_CQI[k] - MU\_MIMO\_CQI[k]}{k} \quad (3)$$

DELTA_CQI_CONST calculated in Equation (3) is a linear constant calculated based on the layer-based DELTA_CQI[k]. It is assumed herein that the difference DELTA_CQI[k] between layer-based MIMO CQIs has a linear relationship with DELTA_CQI_CONST as shown in Equation (4).

$$DELTA\_CQI[k] \approx k \times DELTA\_CQI\_CONST \quad (4)$$

This assumption is obtained from the fact that there is no difference between a CQI for Single-User MIMO and a CQI for Multi-User MIMO in the first layer (k=0), but by using the interference cancellation technique the interference generated in the upper layer decreases as the number of layers is increased. Under the assumption that the increase in the CQI for Single-User MIMO by the interference reduced due to the increase in the number of layers has a linear relationship, one DELTA_CQI_CONST can be calculated. The access terminal, because it feeds back one DELTA_CQI_CONST, can efficiently reduce the feedback overhead.

The access terminal has a disadvantage in that it can hardly feed back a correct CQI for the alternative MIMO operation. The access network, managing the resources on the premise of the default MIMO operation, will apply the alternative MIMO operation when the alternative MIMO operation provides more gain. Therefore, the access network can put up with the performance degradation in the alternative MIMO operation. In this embodiment, the method of feeding back one DELTA_CQI_CONST at the access terminal can noticeably reduce the feedback overhead while supporting the two types of MIMO operations.

As a method for further reducing the feedback overhead of the DELTA_CQI_CONST, the access terminal reports the DELTA_CQI_CONST not through a physical layer feedback channel but through upper signaling (or upper layer signaling). Generally, the physical layer feedback channel can rapidly feed back the corresponding information, but has a disadvantage in that the physical layer feedback channel uses the greater amount of downlink wireless resources. The way of reporting DELTA_CQI_CONST through upper signaling cannot perform fast feedback, but can reduce the amount of downlink wireless resources consumed. However, the way of reporting DELTA_CQI_CONST through upper signaling should occasionally report the DELTA_CQI_CONST measured every time on a time-averaged basis.

When the access terminal transmits one channel-coded packet by demultiplexing rather than transmitting the channel-coded packet independently for every layer, a MIMO CQI is not needed to be expressed separately for each individual layer. That is, a CQI in Multi-User MIMO can be expressed as MU_MIMO_CQI, and a CQI in Single-User MIMO can be expressed as SU_MIMO_CQI. In this case, MU_MIMO_CQI and SU_MIMO_CQI have the following relationship of Equation (5).

MU_MIMO_CQI=SU_MIMO_CQI−DELTA_CQI

SU_MIMO_CQI=MU_MIMO_CQI+DELTA_CQI (5)

In this case, by simply feeding back only the DELTA_CQI, it is possible to calculate not only the CQI of the default MIMO mode but also the CQI of the alternative MIMO mode. Similarly, as a method for further reducing the feedback overhead of the DELTA_CQI, the access terminal reports the DELTA_CQI not through the physical layer feedback channel but through the upper signaling. The upper signaling, when reporting DELTA_CQI, should periodically report MEAN_DELTA_CQI obtained by time-averaging the DELTA_CQI measured every time.

Figure 2:
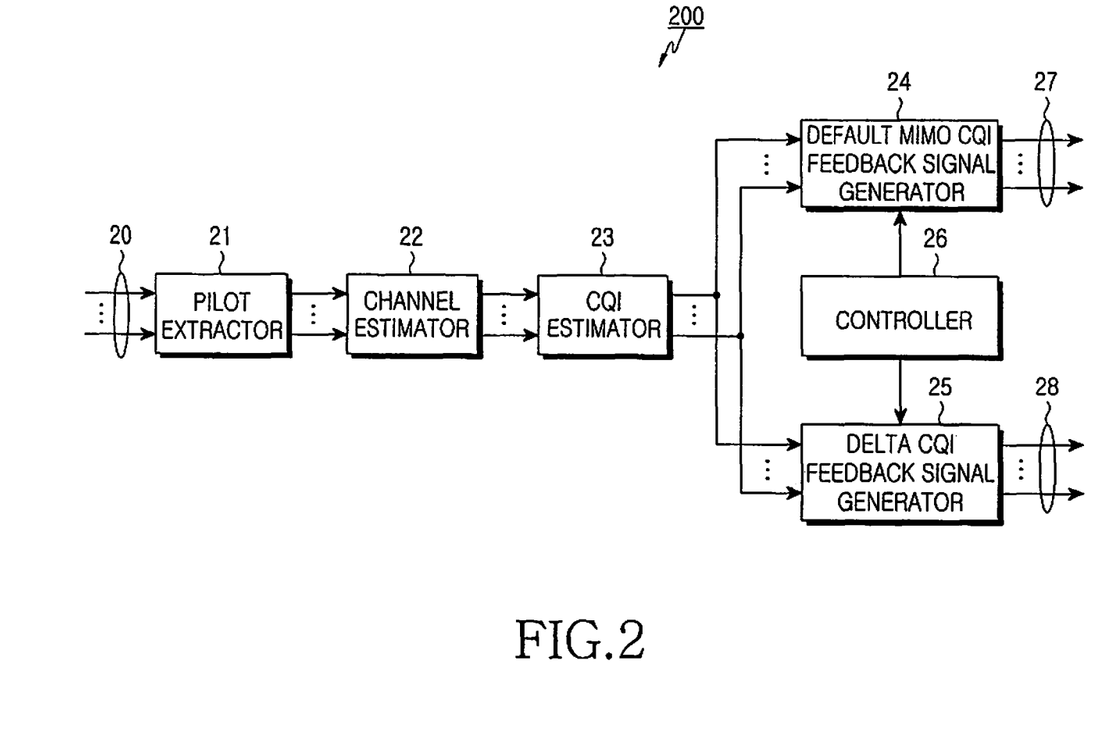
FIG. 2 illustrates a structure of an access terminal according to an embodiment of the present invention.

FIG. 2 illustrates a structure of an access terminal according to an embodiment of the present invention. Shown in FIG. 2 is a CQI feedback-related apparatus of the access terminal supporting CQI feedback.

Referring to FIG. 2, a signal 20 received via multiple antennas of an access terminal 200 is input to a pilot extractor 21. The pilot extractor 21 extracts a MIMO pilot signal through a received channel to estimate a MIMO channel, and delivers it to a channel estimator 22. The channel estimator 22 estimates a MIMO channel through the MIMO pilot signal, and delivers the channel-estimated value to a CQI estimator 23. The CQI estimator 23 can calculate a CQI in Single-User MIMO and a CQI in Multi-User MIMO using the channel-estimated value. As to the CQI for Single-User MIMO, the CQI estimator 23 calculates the CQI under the assumption that the inter-layer interference is cancelled. As to the CQI for Multi-User MIMO, the CQI estimator 23 calculates the CQI with the inter-layer interference considered, because the inter-layer interference cannot be cancelled.

A controller 26 controls a generator a default MIMO CQI feedback signal generator 24 to generate a feedback signal of a default MIMO CQI for the default MIMO operation based on the default MIMO operation mode set by an access network, and controls a DELTA CQI feedback signal generator 25 to generate a feedback signal of a DELTA CQI for the alternative MIMO operation.

If the default MIMO operation is set to Single-User MIMO, the default MIMO CQI feedback signal generator 24 generates a feedback signal by expressing the CQI for Single-User MIMO as a default MIMO CQI. In addition, the DELTA CQI feedback signal generator 25 generates a feedback signal by expressing the CQI for Multi-User MIMO as a DELTA CQI (DELTA_CQI, DELTA_CQI[k], DELTA_CQI_CONST, or MEAN_DELTA_CQI). However, if the default MIMO operation is set to Multi-User MIMO, the default MIMO CQI feedback signal generator 24 generates a feedback signal by expressing the CQI for Multi-User MIMO as a default MIMO CQI. In addition, the DELTA CQI feedback signal generator 25 generates a feedback signal by expressing the CQI for Single-User MIMO as a DELTA CQI (DELTA_CQI). The generated default MIMO CQI feedback signal 27 is transmitted to an access network 300 over a physical layer feedback channel, and the generated DELTA CQI feedback signal 28 is transmitted to the access network 300 through the physical layer feedback channel or upper signaling. The DELTA CQI feedback signal 28 can transmit either multiple layer-based DELTA_CQI[k] or one DELTA_CQI_CONST according to the setting.

Figure 3:
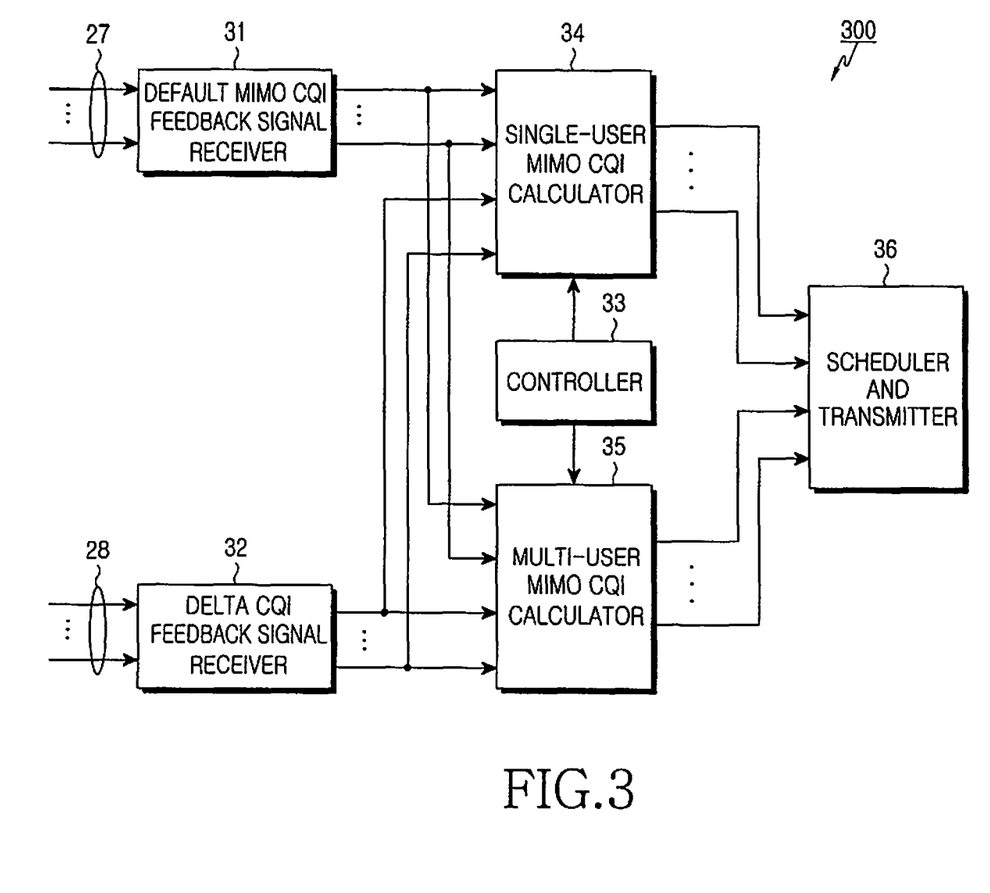
FIG. 3 illustrates a structure of an access network according to an embodiment of the present invention.

FIG. 3 illustrates a structure of an access network according to an embodiment of the present invention. Shown in FIG. 3 is a CQI feedback-related apparatus of the access network supporting CQI feedback.

Referring to FIG. 3, an access network 300 receives the default MIMO CQI feedback signal 27 and the DELTA CQI feedback signal 28 reported by the access terminal 200 by means of a default MIMO CQI feedback signal receiver 31 and a DELTA CQI feedback signal receiver 32, respectively.

A controller 33 of the access network 300 controls a Single-User MIMO CQI calculator 34 (or CQI calculator for Single-User MIMO) and a Multi-User MIMO CQI calculator 35 (or CQI calculator for Multi-User MIMO) based on the default MIMO operation mode set by the access network.

If the default MIMO operation is set to Single-User MIMO, the Single-User MIMO CQI calculator 34 parses the intact default MIMO CQI feedback as a Single-User MIMO CQI, and the Multi-User MIMO CQI calculator 35 subtracts a DELTA CQI from the default MIMO CQI and parses the resulting value as a Multi-User MIMO CQI. However, if the default MIMO operation is set to Multi-User MIMO, the Multi-User MIMO CQI calculator 35 parses the intact default MIMO CQI feedback as a Multi-User MIMO CQI, and the Single-User MIMO CQI calculator 34 adds a DELTA CQI to the default MIMO CQI and parses the resulting value as a Single-User MIMO CQI. The CQI for Single-User MIMO and the CQI for Multi-User MIMO calculated by the Single-User MIMO CQI calculator 34 and the Multi-User MIMO CQI calculator 35 are delivered to a scheduler and transmitter 36. The scheduler and transmitter 36 schedules and transmits transmission packet data using the CQI for Single-User MIMO and the CQI for Multi-User MIMO.

Figure 4:
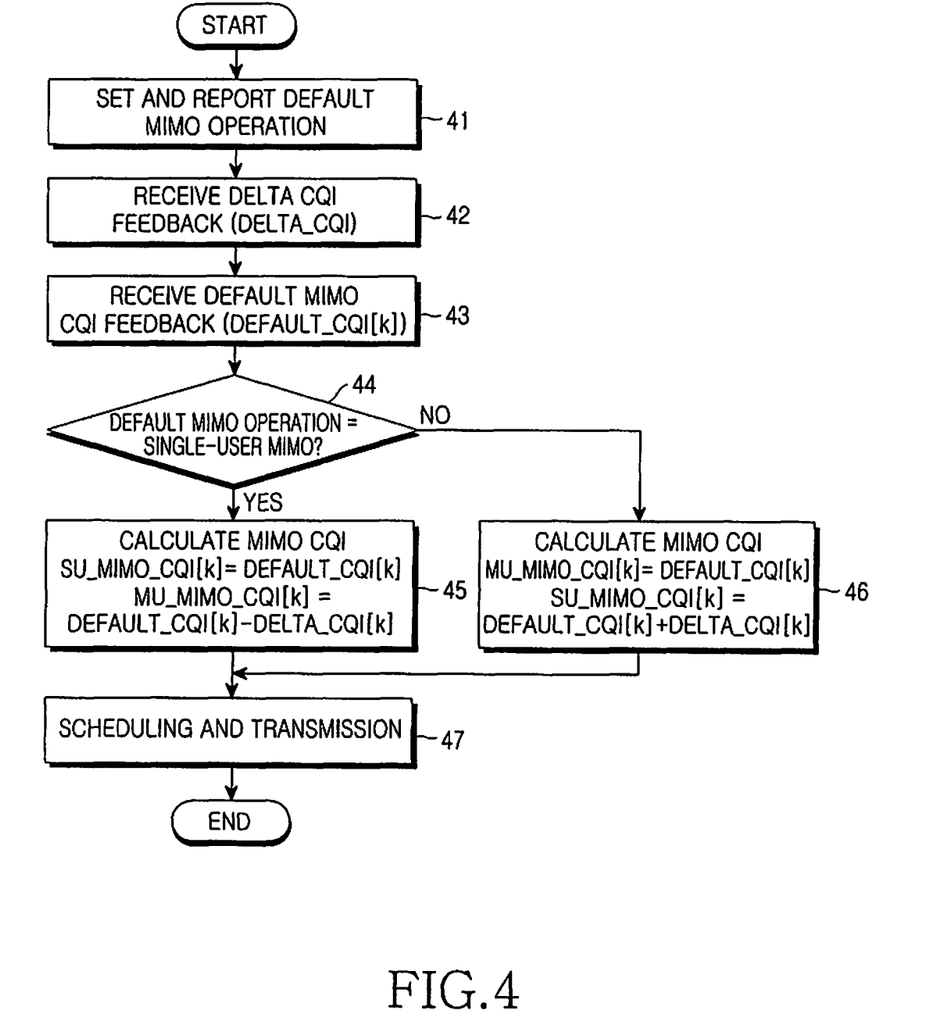
FIG. 4 illustrates an operation of an access network according to an embodiment of the present invention.

FIG. 4 illustrates an operation of an access network according to an embodiment of the present invention. Shown in FIG. 4 is a CQI feedback reception and application process of the access network supporting CQI feedback.

Referring to FIG. 4, in step 41, an access network 300 sets a default MIMO operation and reports the setting to an access terminal 200. The access terminal 200 calculates a default MIMO CQI based on the set default MIMO operation, and feeds back its absolute value through a physical layer. In addition, the access terminal 200 will calculate a DELTA CQI based on the alternative MIMO operation, and report the calculation result to the access network 300 through the physical layer or upper signaling. In step 42, the access network 300 receives the DELTA CQI feedback from the access terminal 200. The DELTA CQI feedback means DELTA_CQI, and is used for calculating a CQI for the alternative MIMO operation. When the DELTA_CQI_CONST is received, DELTA_CQI is calculated as shown by Equation (4). When the MEAN_DELTA_CQI is received, the intact MEAN_DELTA_CQI is used as DELTA_CQI.

In step 43, the access network 300 receives a default MIMO CQI feedback. The default MIMO CQI DEFALUT_CQI is a CQI needed in the default MIMO operation mode. Here, steps 42 and 43 are exchangeable. Next, in steps 45 and 46, the access network 300 calculates CQIs for the two MIMO operations. In step 44, the access network 300 determines whether the default MIMO operation is Single-User MIMO or Multi-User MIMO. The access network 300 determines one of MIMO CQI calculation methods of steps 45 and 46 according to the setting of the default MIMO operation. If the default MIMO operation is set to Single-User MIMO, the access network 300 performs the MIMO CQI calculation in step 45. That is, the access network 300 substitutes the intact DEFALUT_CQI[k] in a Single-User MIMO CQI, and substitutes a value obtained by subtracting DELTA_CQI[k] from DEFALUT_CQI[k] in a Multi-User MIMO CQI. However, if the default MIMO operation is set to Multi-User MIMO, the access network 300 performs the MIMO CQI calculation in step 46. That is, the access network 300 substitutes the intact DEFALUT_CQI[k] in a Multi-User MIMO CQI, and substitutes a value obtained by adding DELTA_CQI[k] to DEFALUT_CQI[k] in a Single-User MIMO CQI.

The DELTA_CQI[k] calculation methods of steps 45 and 46 are performed as follows depending on what is fed back as the DELTA CQI.

First, when the layer-based DELTA_CQI[k] is directly fed back as the DELTA CQI, the received intact DELTA_CQI[k] is used.

Second, DELTA_CQI_CONST is received as the DELTA CQI, the access network 300 calculates DELTA_CQI[k] based on Equation (4).

Third, when MEAN_DELTA_CQI is received as the DELTA CQI, the access network 300 calculates MU_MIMO_CQI and SU_MIMO_CQI without the need to calculate the layer-based MIMO CQI MU_MIMO_CQI[k] and SU_MIMO_CQI[k] because the access terminal 200 transmits one channel-coded packet to each layer by demultiplexing during MIMO transmission. The access network 300 uses the received DELTA CQI MEAN_DELTA_CQI as DELTA_CQI needed in this calculation. That is, the equation needed in step 45 is Equation (6), and the equation needed in step 46 is Equation (7).

$$SU\_MIMO\_CQI = DEFALUT\_CQI$$

$$MU\_MIMO\_CQI = SU\_MIMO\_CQI - MEAN\_DELTA\_CQI \quad (6)$$

$$MU\_MIMO\_CQI = DEFALUT\_CQI$$

$$SU\_MIMO\_CQI = MU\_MIMO\_CQI + MEAN\_DELTA\_CQI \quad (7)$$

In step 47, a scheduler and transmitter 36 of the access network 300 schedules and transmits the transmission packet data using the Single-User CQI and Multi-User CQI calculated in steps 45 and 46.

Figure 5:
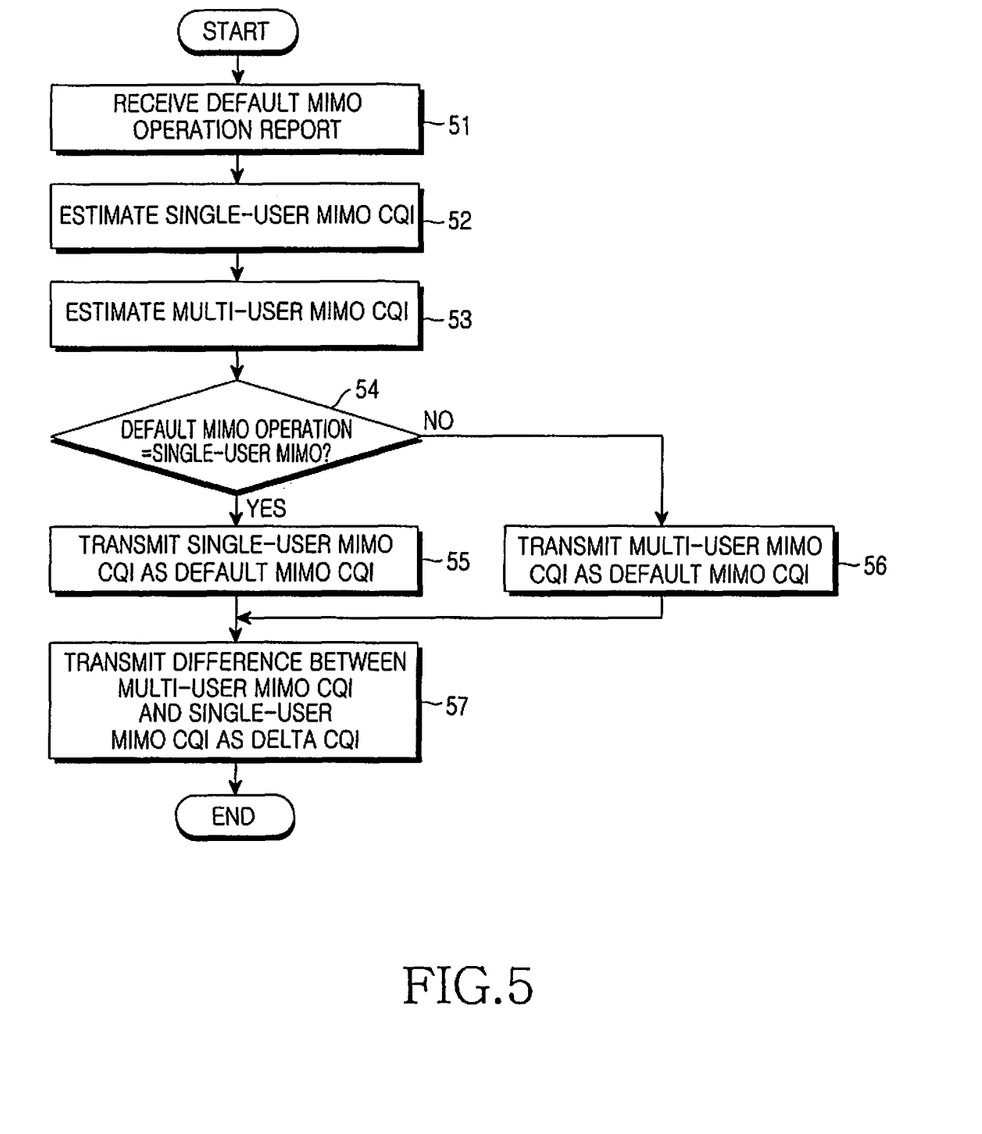
FIG. 5 illustrates an operation of an access terminal according to an embodiment of the present invention.

FIG. 5 illustrates an operation of an access terminal according to an embodiment of the present invention. Shown in FIG. 5 is a CQI feedback generation process of the access terminal supporting CQI feedback.

Referring to FIG. 5, in step 51, an access terminal 200 receives default MIMO operation mode information reported by an access network 300. The access terminal 200 estimates a CQI for Single-User MIMO in step 52, and estimates a CQI for Multi-User MIMO in step 53. Here, steps 52 and 53 are exchangeable. The access terminal 200 determines in step 54 whether the default MIMO operation is set to Single-User MIMO or Multi-User MIMO. The access terminal 200 determines one of the default MIMO CQI transmission methods of steps 55 and 56 according to the setting of the default MIMO operation mode. If the default MIMO operation is set to Single-User MIMO, the access terminal 200 sets a CQI for Single-User MIMO to a default MIMO CQI and transmits it to the access network 300 in step 55. However, if the default MIMO operation is set to Multi-User MIMO, the access terminal 200 sets a CQI for Multi-User MIMO to a default MIMO CQI and transmits the Multi-User MIMO CQI to the access network 300 in step 56. The default MIMO CQI is transmitted over the physical layer. In step 57, the access terminal 200 calculates a difference between the CQI for Multi-User MIMO and the CQI for Single-User MIMO, sets the difference as a DELTA CQI, and transmits the difference to the access network 300.

The DELTA CQI can be either expressed separately for each individual layer, or expressed with one DELTA_CQI_CONST or MEAN_DELTA_CQI to reduce the amount of feedback. In addition, the DELTA CQI can be either delivered through the physical layer, or delivered through upper signaling to save the wireless resources.

As is apparent from the foregoing description, the present invention provides a CQI expression method for preventing the excessive increase in the CQI feedback overhead while supporting both the Single-User MIMO and Multi-User MIMO operations. If the default MIMO operation is set to Single-User MIMO or Multi-User MIMO, the access network can receive the MIMO CQI feedback optimized for the corresponding MIMO operation. However, when the scheduler has selected the alternative MIMO operation other than the default MIMO operation, the access network calculates a CQI necessary for the alternative MIMO operation based on the default MIMO CQI feedback for the default MIMO operation and the default MIMO operation for the alternative MIMO operation. That is, the present invention enables the best operation in the default MIMO operation by providing the correct CQI, and enables the second best operation in the alternative MIMO operation. Therefore, with use of the present invention, the access network can dynamically select the Single-User MIMO and Multi-User MIMO operations, contributing to an increase in the resource management efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting feedback information in a communication system supporting multiple transmission methods with multi antenna transmission, the method comprising:
   receiving information for a default Multiple Input Multiple Output (MIMO) mode;
   determining whether the default MIMO mode is a Single-User MIMO mode or a Multi-User MIMO mode based on the information for the default MIMO mode;
   calculating first Channel Quality Indicator (CQI) feedback information for one of the Single-User MIMO mode and the Multi-User MIMO mode determined as the default MIMO mode; and
   transmitting the first CQI feedback information and DELTA CQI feedback information, which is a differential value between the first CQI feedback information and second CQI feedback information for a non-default MIMO mode.

2. The method of claim 1, further comprising:
   calculating the second CQI feedback information for one of the Single-User MIMO mode and the Multi-User MIMO mode not determined as the default MIMO mode;
   calculating the DELTA CQI feedback information being the differential value between the first CQI feedback information and the second CQI feedback information.

3. A method for receiving feedback information in a communication system supporting multiple transmission methods with multi antenna transmission, the method comprising:
   transmitting information for a default Multiple Input Multiple Output (MIMO) mode;
   transmitting a pilot; and
   receiving first Channel Quality Indicator (CQI) feedback information and DELTA CQI feedback information;
   wherein the first CQI feedback information is calculated for one of a Single-User MIMO mode and a Multi-User MIMO mode determined as the default MIMO mode, and the DELTA CQI feedback information is a differential value between the first CQI feedback information and second CQI feedback information for a non-default MIMO mode.

4. The method of claim 3, wherein:
   the DELTA CQI feedback information is the differential value between the first CQI feedback information and the second CQI feedback information for one of the Single-User MIMO mode and the Multi-User MIMO mode not determined as the default MIMO mode.

5. An apparatus for transmitting feedback information in a communication system supporting multiple transmission methods with multi antenna transmission, the apparatus comprising:
   a receiver configured to receive information for a default Multiple Input Multiple Output (MIMO) mode;
   a Channel Quality Indicator (CQI) estimator configured to determine whether the default MIMO mode is a Single-User MIMO mode or a Multi-User MIMO mode based on the information for the default MIMO mode, and calculate first CQI feedback information for one of the Single-User MIMO mode and the Multi-User MIMO mode determined as the default MIMO mode; and
   a transmitter configured to transmit the first CQI feedback information and DELTA CQI feedback information, which is a differential value between the first calculated COI feedback information and second CQI feedback information for a non-default MIMO mode.

6. The apparatus of claim 5, wherein the CQI estimator is further configured to calculate the second CQI feedback information for one of the Single-User MIMO mode and the Multi-User MIMO mode not determined as the default MIMO mode; and calculate the DELTA CQI feedback information being the differential value between the first CQI feedback information and the second CQI feedback information.

7. An apparatus for receiving feedback information in a communication system supporting multiple transmission methods with multi antenna transmission, the apparatus comprising:
   a first transmitter configured to transmit information for a default Multiple Input Multiple Output (MIMO) mode;
   a second transmitter configured to transmit a pilot; and
   a first receiver configured to receive first Channel Quality Indicator (CQI) feedback information and DELTA CQI feedback information,
   wherein the first CQI feedback information is calculated for one of a Single-User MIMO mode and a Multi-User MIMO mode determined as the default MIMO mode, and the DELTA CQI feedback information is a differential value between the first CQI feedback information and second CQI feedback information for a non-default MIMO mode.

8. The apparatus of claim 7, wherein the DELTA CQI feedback information is the differential value between the first CQI feedback information and the second CQI feedback information for one of the Single-User MIMO mode and the Multi-User MIMO mode not determined as the default MIMO mode.

9. A communication system supporting multiple transmission methods with multi antenna transmission, the communication system comprising:
   a transmitting apparatus configured to transmit information for a default Multiple Input Multiple Output (MIMO) mode and a pilot, and receive first Channel Quality Indicator (CQI) feedback information and DELTA CQI feedback information, and a receiving apparatus configured to receive the information for the default MIMO mode, determine whether the default MIMO mode is a Single-User MIMO mode or a Multi-User MIMO mode based on the information for the default MIMO mode, calculate the first CQI feedback information for one of the Single-User MIMO mode and the Multi-User MIMO mode determined as the default MIMO mode, and transmit the first CQI feedback information and the DELTA CQI feedback information, which is a differential value between the first calculated CQI feedback information and second CQI feedback information for a non-default MIMO mode.

* * * * *